US010885508B2

(12) United States Patent
Gage et al.

(10) Patent No.: US 10,885,508 B2
(45) Date of Patent: Jan. 5, 2021

(54) ELECTRONIC COMMERCE TRANSACTION AUTHENTICATION BASED ON A VEHICLE TRAVEL ROUTE DATA

(71) Applicant: Toyota Motor Engineering & Manufacturing North America, Inc., Erlanger, KY (US)

(72) Inventors: Sergei I. Gage, Redford, MI (US); Nicholas S. Sitarski, Ypsilanti, MI (US); Ida T. Mai-Krist, White Lake, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 350 days.

(21) Appl. No.: 15/443,689

(22) Filed: Feb. 27, 2017

(65) Prior Publication Data

US 2018/0130044 A1 May 10, 2018

Related U.S. Application Data

(60) Provisional application No. 62/420,125, filed on Nov. 10, 2016.

(51) Int. Cl.
*G06Q 20/32* (2012.01)
*G06Q 20/40* (2012.01)

(52) U.S. Cl.
CPC ....... *G06Q 20/3224* (2013.01); *G06Q 20/405* (2013.01)

(58) Field of Classification Search
CPC .................. G06Q 20/3224; G06Q 20/405
See application file for complete search history.

(56) References Cited

U.S. PATENT DOCUMENTS

| | | | |
|---|---|---|---|
| 6,456,234 B1* | 9/2002 | Johnson | G06Q 30/0277 342/357.48 |
| 9,047,602 B2 | 6/2015 | Alrabady et al. | |
| 2002/0062472 A1* | 5/2002 | Medlock | H04B 1/406 455/560 |
| 2009/0202107 A1* | 8/2009 | Wilson | G06K 9/00818 382/103 |
| 2010/0109835 A1 | 5/2010 | Alrabady et al. | |
| 2014/0195047 A1* | 7/2014 | King | H04L 9/3215 700/237 |
| 2015/0220916 A1 | 8/2015 | Prakash et al. | |
| 2016/0057248 A1* | 2/2016 | Tankha | H04L 67/306 726/6 |
| 2016/0180395 A1* | 6/2016 | Rai | G01C 21/3484 701/1 |
| 2016/0321665 A1* | 11/2016 | Thomas | G06Q 20/20 |
| 2017/0032370 A1* | 2/2017 | Beltramino | G06Q 20/36 |
| 2017/0270497 A1* | 9/2017 | Tsou | G06Q 20/401 |

* cited by examiner

*Primary Examiner* — Scott C Anderson
(74) *Attorney, Agent, or Firm* — Christopher G. Darrow; Darrow Mustafa PC

(57) ABSTRACT

A device and method in a vehicle control unit for providing electronic commerce transaction authentication are provided. Upon receiving an electronic commerce transaction request relating to a transaction source, the vehicle control unit authenticates the transaction source against a vehicle travel route parameter by comparing the source location data with the vehicle travel route parameter. When the source location data compares favorably with the vehicle travel route parameter, an electronic commerce authentication is generated in response to the request, and transmitted.

12 Claims, 4 Drawing Sheets vehicle control unit 300

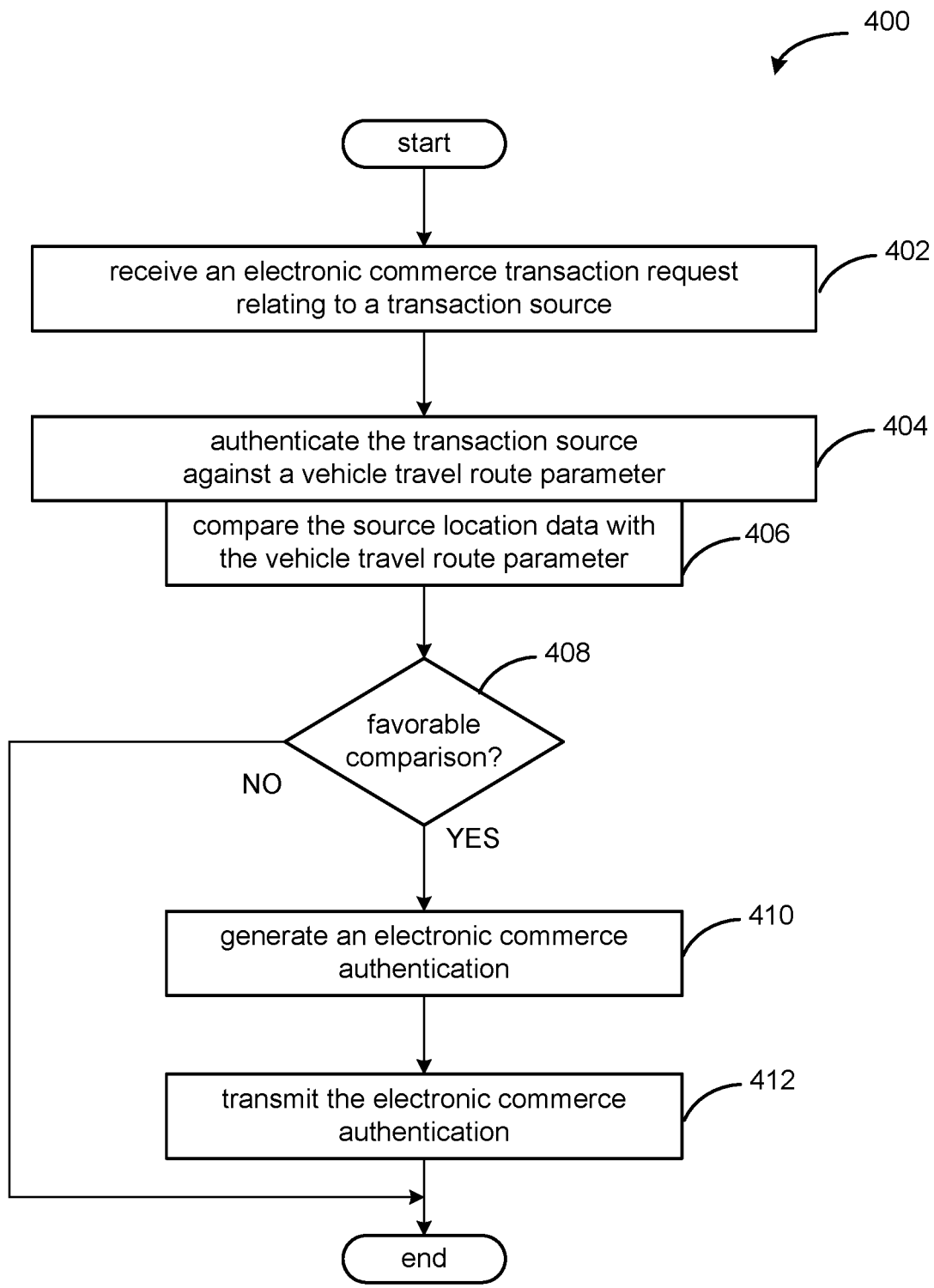

ELECTRONIC COMMERCE TRANSACTION AUTHENTICATION BASED ON A VEHICLE TRAVEL ROUTE DATA

CROSS REFERENCE TO RELATED APPLICATIONS

This application claims benefit of U.S. Provisional Application No. 62/420,125, filed on Nov. 10, 2016, which is herein incorporated by reference in its entirety.

FIELD

The subject matter described herein relates in general to electronic commerce transaction devices and, more particularly, to the authenticating electronic commerce transactions based on vehicle location and time-marker data.

BACKGROUND

Digital wallet applications for smartphones and/or other handheld mobile devices have been gaining popularity for the secure storage of identification and financial information for users. Though such applications are useful, time-saving devices, the risk exposure to data loss or data breaches, and subsequent financial losses remain. It is desirable to provide improved financial authentication mechanisms to further minimize the risk while maintaining the convenience of such transactional

SUMMARY

A device and methods for device and method for improving security in financial transaction applications based on travel route authentication are disclosed.

In one implementation, a method in a vehicle control unit for providing electronic commerce transaction authentication is disclosed. Upon receiving an electronic commerce transaction request relating to a transaction source, the vehicle control unit authenticates the transaction source against a vehicle travel route parameter by comparing the source location data with the vehicle travel route parameter. When the source location data compares favorably with the vehicle travel route parameter, an electronic commerce authentication is generated in response to the request, and transmitted.

In another implementation, a vehicle control unit for providing electronic commerce transaction authentication is disclosed. The vehicle control unit includes a wireless communication interface, a processor and memory. The wireless communication interface services communication with a digital wallet application of a handheld mobile device. The processor, being coupled to the wireless communication interface, controls operations of the vehicle control unit. The memory, being coupled to the processor, stores data and program instructions used by the processor. The processor being configured to execute instructions stored in the memory to receive, via a communication link with the handheld mobile device, an electronic commerce transaction request relating to a transaction source, and authenticate the transaction source against a vehicle travel route parameter by comparing the transaction source location data with the vehicle travel route parameter. When the transaction source location data compares favorably with the vehicle travel route parameter, the processor operates to generate, in response to the electronic commerce transaction request, an electronic commerce authentication that includes vehicle identification data; and transmit, via the communication link with the handheld mobile device, the electronic commerce authentication.

BRIEF DESCRIPTION OF THE DRAWINGS

The description makes reference to the accompanying drawings wherein like reference numerals refer to like parts throughout the several views, and wherein:

FIG. 4 shows an example process for vehicle-based travel route authentication for an electronic commerce transaction.

DETAILED DESCRIPTION

Figure 1:
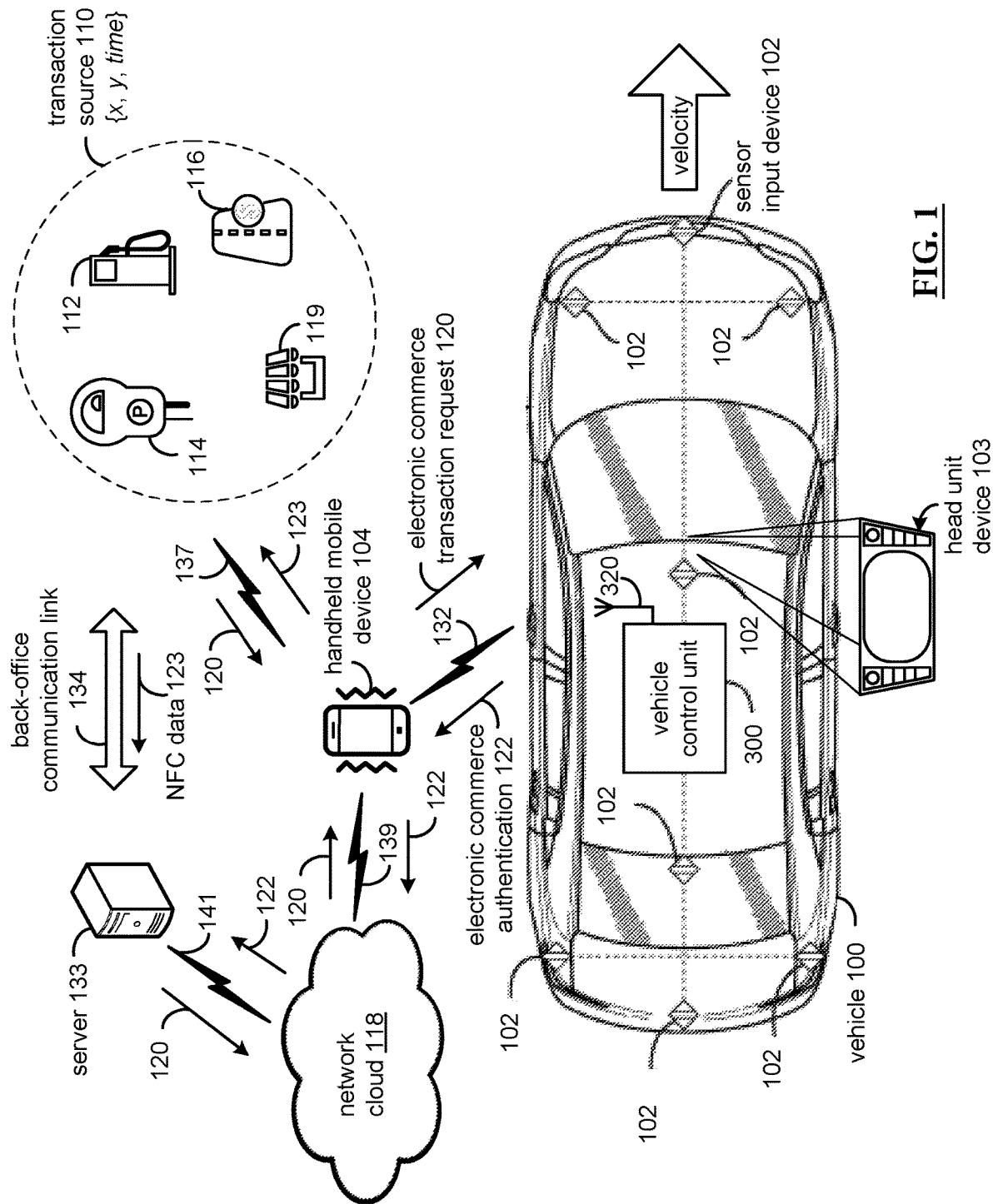
FIG. 1 shows a schematic of a vehicle including a vehicle control unit for providing electronic commerce transaction authentication.

A device and method for improving security in financial transaction applications are provided. Financial transaction applications, also referred to as digital wallets, allow storage of a user's financial and identity information to carry out the transaction using near field communication technologies with like-protocol devices.

In the example embodiments provided, electronic commerce transactions may be conducted on a client-side digital wallet and/or a server-side digital wallet basis. In these situations, security may be improved on a vehicle-centric authentication basis for service and/or product transactions relating to a vehicle proximity. Such authentication may be include vehicle location data, vehicle identification data, vehicle location and time-marker data, or a combination thereof.

Client-side digital wallets generally refer to those maintained by an end user, and may be executable on a handheld mobile device. The end user may generally wirelessly download and install the application, and then provide pertinent payment and personal identification information, all of which is stored on the handheld mobile device, as well as a personal computer. At a vendor's point-of-sale location (such as a brick-and-mortar grocery store, clothing store, fueling station, etc.), the digital wallet application completes most of the basic information with the point-of-sale device through near field communications.

Server-side digital wallets generally may be considered as thin-client applications where end user payment and personal identification information are stored on a third-party server (that is, bank service provider servers, such as Visa, MasterCard, etc.). Such an architecture is considered to provide greater security over a client-side digital wallet because the personal and financial information may be stored apart from the device. Accordingly, if the device is lost, then the information remains secured on the server side and not on the user's handheld mobile device.

In either instance, verification may be requested from the user for completing an electronic commerce transaction. For example, before a transaction completes, an end user may be required to provide an e-mail address and password. After which, the vendor receives payment from a chosen bank card account. In this manner, the card account information remains concealed within the data communications between the point-of-sale device and the end user device executing the application.

In the event the device is hacked, missing, stolen, etc., a non-authorized user may fraudulently attempt to complete an electronic commerce transaction with the handheld mobile device.

The authentication method and apparatus described herein, authentication may be provided based on location and time-mark data relating to a vehicle coupled with the digital wallet. For example, an end user generally travels to brick-and-mortar service and product providers (such as hotels, restaurants, toll-plazas, fueling stations, parking lots, etc.) that provide electronic commerce transaction capabilities.

In effect, access to financial account data may be restricted on a location-and-time basis. For example, a user may enter a destination into a navigation user interface that may be executable by a vehicle head unit device, or executable on a handheld mobile device. A route and associated travel corridor may be based on vehicle and/or handheld mobile device location technology (such as GPS). At this point, the vehicle location with respect to time may be identified by the navigation application. Accordingly, the digital wallet application may be accessible for financial transactions while in the corridor, for an expected time relating to route travel, and to purchase vehicle-related services such as tolls fees, parking fees, etc.

As a further aspect, the digital wallet application may be active only during an expected travel time slot, or window, relative to vehicle speed over a travel route and/or corridor. For example, a digital wallet application may be active for an expected or anticipated time period for which the vehicle is expected to encounter a toll tag station. If by chance another individual has a user's digital wallet data, transactions would not be authorized outside of times and locations for the anticipated travel route corridor (geographically and time-based corridors).

Generally, an end user reaches these destinations by travel with their vehicle, which has identifying data including a vehicle identification number, and a known itinerary either by (a) entering into a vehicle-based or handheld mobile device, and/or (b) habit, such as a work commute. The itinerary includes start/stop and travel route data, which further includes time markers relating to a start and duration of travel to reach a destination. Accordingly, the method and apparatus of the embodiments described with relation to FIGS. 1-4 relate to electronic transaction authentication based on identified vehicle location and time-marker information for a travel route.

FIG. 1 shows a schematic of a vehicle 100 including a vehicle control unit 300 for providing electronic commerce transaction authentication. The vehicle 100 may include sensor input devices 102, and a head unit device 103 coupled to the vehicle control unit 300. The vehicle control unit 300 may wirelessly communicate through antenna 320.

The plurality of sensor input devices 102 can be positioned on the outer surface of the vehicle 100, or may be positioned in a concealed fashion for aesthetic purposes with regard to the vehicle. Moreover, the sensors may operate at frequencies in which the vehicle body or portions thereof appear transparent to the respective sensor device.

Communication between the sensors may be on a bus basis, and may also be used or operated by other systems of the vehicle 100. For example, the sensor input devices 102 may be coupled by a combination of network architectures such as a Body Electronic Area Network (BEAN), a Controller Area Network (CAN) bus configuration, an Audio Visual Communication-Local Area Network (AVC-LAN) configuration, and/or other combinations of additional communication-system architectures to provide communications between devices and systems of the vehicle 100. Moreover, the sensor input devices 102 and the head unit device 103 may be further coupled to the vehicle control unit 300 via such communication-system architectures.

The one or more of the sensor input devices 102 may operate to monitor ambient conditions relating to the vehicle 100, and may operate to provide image recognition capability. The image recognition data may be further used to verify and/or corroborate vehicle location information, as well as to provide information relating to visual and tactile changes to the vehicle driving environment.

The sensor input devices 102 may be provided by a Light Detection and Ranging (LIDAR) system, in which the sensor input devices 102 may capture data related to laser light returns from physical objects in the environment of the vehicle 100. The sensor input devices 102 may also include a combination of lasers (LIDAR) and milliwave radar devices. On the reconstructed data, image recognition for road signage and landmarks may be discerned and used for further corroborate a vehicle location as may relate to an electronic commerce transaction.

The vehicle 100 can also include options for operating at a velocity in manual mode, autonomous mode, and/or driver-assist mode.

When the vehicle 100 is in manual mode, the driver manually controls the vehicle systems, which may include a propulsion system, a steering system, a stability control system, a navigation system, an energy system, and any other systems that can control various vehicle functions (such as the vehicle climate or entertainment functions, etc.). The vehicle 100 can also include interfaces for the driver to interact with the vehicle systems, for example, one or more interactive displays, audio systems, voice recognition systems, buttons and/or dials, haptic feedback systems, or any other means for inputting or outputting information.

In an autonomous mode of operation, a computing device, which may be provided by the vehicle control unit 300, or in combination therewith, can be used to control one or more of the vehicle systems without the vehicle user's direct intervention. Some vehicles may also be equipped with a "driver-assist mode," in which operation of the vehicle 100 can be shared between the vehicle user and a computing device.

For example, the vehicle operator can control certain aspects of the vehicle operation, such as steering, while the computing device can control other aspects of the vehicle operation, such as braking and acceleration. When the vehicle 100 is operating in autonomous (or driver-assist) mode, the computing device, such as the vehicle control unit 300, issues commands to the various vehicle systems to direct their operation, rather than such vehicle systems being controlled by the vehicle user.

Figure 2:
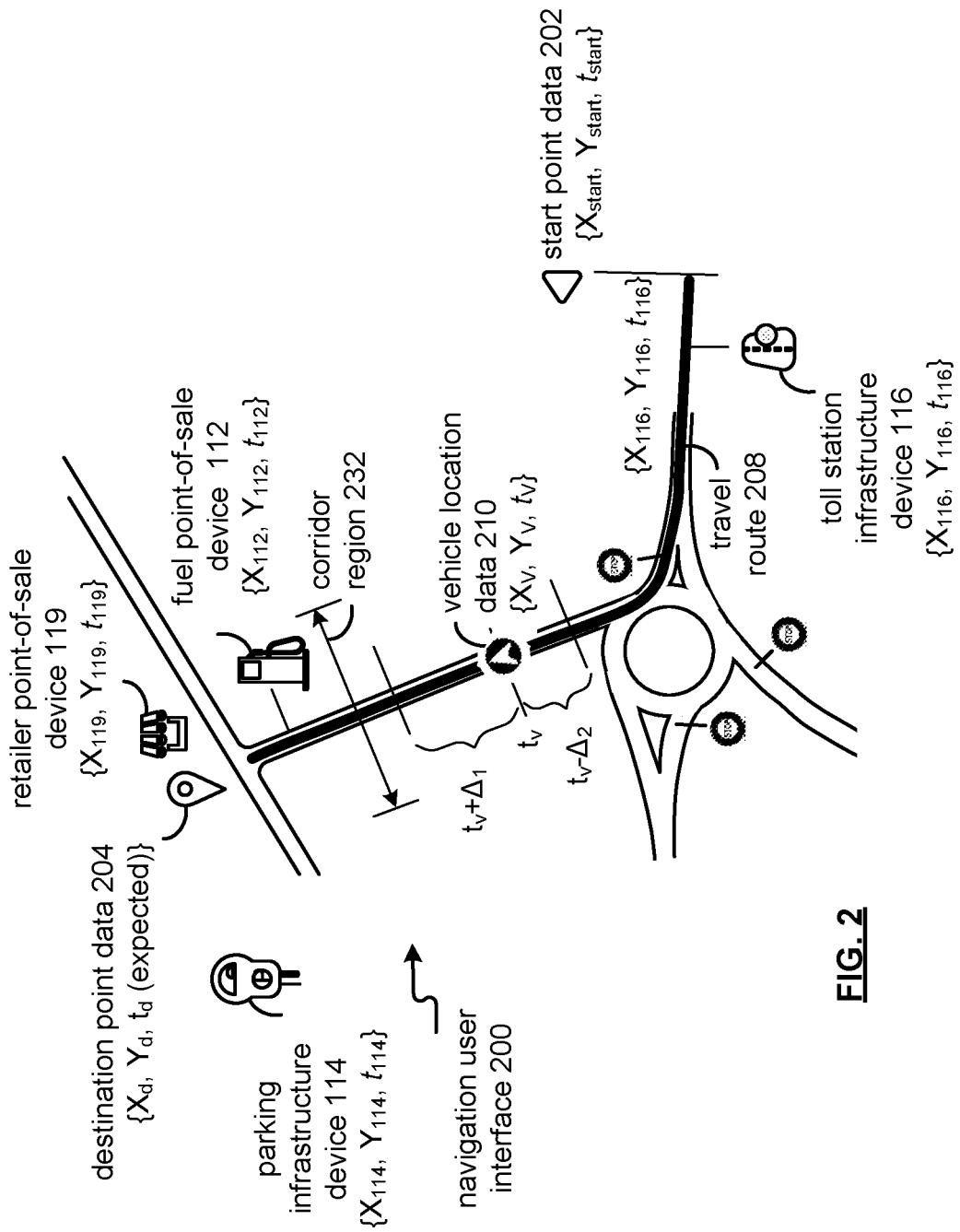
FIG. 2 shows a navigation user interface for generating travel route data for the electronic commerce transaction authentication by the vehicle control unit of FIG. 1.
Figure 3:
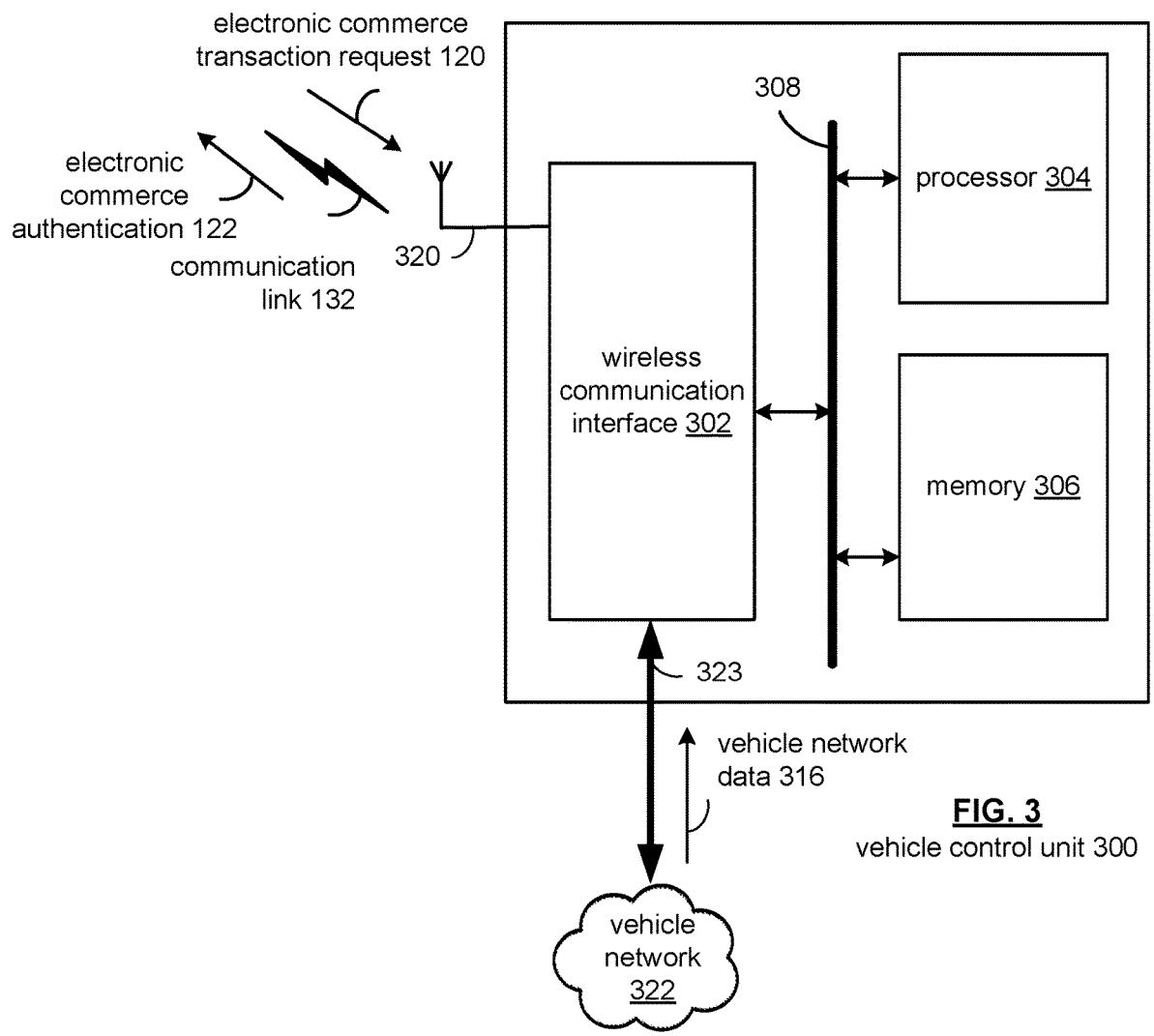
FIG. 3 shows a block diagram of the vehicle control unit of FIG. 1.

As shown in FIG. 1, the vehicle control unit 300 may be configured to provide wireless communication with a user device through the antenna 320, with other vehicles (vehicle-to-vehicle), and/or with infrastructure (vehicle-to-infrastructure), or with devices through a network cloud, which is discussed in detail with respect to FIGS. 2-4.

The handheld mobile device 104 and/or the head unit device 103 may provide electronic commerce transaction capability with a corresponding digital wallet application, which may be a client-side digital wallet application, a server-side digital wallet application, etc.

As may be appreciated, the handheld mobile device 104 and/or head unit device 103, by way of example, may be a device including hardware (for example, chipsets, processors, memory, etc.) for communicatively coupling with the network cloud 118, and the vehicle control unit 300 via antenna 320, and may also include an antenna for communicating over one or more of the wireless computer networks described herein. Also, the handheld mobile device 104 and/or the head unit device 103 may include a touch screen to provide visual output or graphic user interfaces such as, for example, maps, navigation, entertainment, information, infotainment, and/or combinations thereof.

Examples of handheld mobile devices 104 may include a cell phone, a smart phone, personal digital assistant (PDA) devices, tablet computers, e-readers, etc. As may be further appreciated, the head unit device 103 and the handheld mobile device 104 may include tactile input and/or control inputs such that communicatively couples the tactile input to other control units and/or modules of the vehicle 100. The tactile input data may provided by devices capable of transforming mechanical, optical, or electrical signals into a data signal capable of being transmitted via the internal network of the vehicle 100, as described herein.

Electronic commerce transactions may occur through a transaction source 110, which in turn correspond to the physical presence of the vehicle 100. That is, by virtue of traveling with the vehicle, the handheld mobile device 104 in possession of the end user is placed in proximity of the transaction sources 110. In effect, the handheld mobile device 104 may be coupled with the vehicle 100 and associated travel routes to authenticate electronic commerce transactions. For comparison, web-based online merchants may conduct electronic transactions from the home, office, or non-transitory locations, which may be authorized in some respect by an expected DNS or IP addresses for a customary location by the end user.

The transaction source 110 may include product transactions, service transactions, or a combination thereof. Examples of product transactions may include fueling station 112, a brick-and-mortar retailer 119 (such as a restaurant, clothier, hardware store, etc.), and so on. Examples of service transactions may include vehicle toll station 116, parking infrastructure device 114 for fee collection, etc. In sum, further authentication of the user may be recognized by the presences of the vehicle 100 in a reasonable proximity to the end user via the handheld mobile device 104.

Generally, in operation, as an end user travels proximal to the transaction source 110, the transaction source 110 (having a location x, y, and time marker) may prompt an electronic transaction. For example, the handheld mobile device 104 may wirelessly exchange near field communication data 123 with a transaction source 110.

As may be appreciated, the wireless communication systems provide the communication links 132, 134, 137, 139 and 141 via the handheld mobile device 104, the transaction source 110, the vehicle control unit 300, the network cloud 118, and server 133. The wireless communication systems may operate in accordance with one or more standards specifications including, but not limited to, 3GPP (3rd Generation Partnership Project), 4GPP (4th Generation Partnership Project), 5GPP (5th Generation Partnership Project), LTE (long term evolution), LTE Advanced, RFID (Radio Frequency ID), NFC (near field communications), IEEE 802.11, Bluetooth, AMPS (advanced mobile phone services), digital AMPS, GSM (global system for mobile communications), CDMA (code division multiple access), LMDS (local multi-point distribution systems), MMDS (multi-channel-multi-point distribution systems), IrDA, Wireless USB, Z-Wave, ZigBee, and/or variations thereof.

Also, as may be appreciated, an electronic commerce transaction with the transaction source 110 may occur based on a passive radio frequency device, such as a toll tag mounted on the vehicle, as well as via a digital wallet application executing on the handheld mobile device 104, the head unit device 103, a combination thereof, etc.

The transaction source 110 receives the NFC data 123 and generates an electronic commerce transaction request 120. The vehicle control unit 300 receives the electronic commerce transaction request 120 via the handheld mobile device 104.

As may be appreciated, the handheld mobile device 104 may be determined a trusted user device (that is paired via Bluetooth, identifiable via DNS, MAC or other forms of identification, etc.). Other examples of trusted user devices may include a vehicular audio/visual control unit, which may be coupled with the head unit device 103, a point-of-sale device, an infrastructure device (such as toll infrastructure station 116), etc. In this manner, an electronic commerce transaction may not be required to be restricted to a singular hardware platform, but to additional hardware platforms that may cooperatively operate with one another.

The vehicle control unit may operate to authenticate the electronic commerce transaction request 120 against a vehicle travel route parameter based on the source location data, as is discussed in detail with reference to FIGS. 2-4. When the source location data compares favorably with the vehicle travel route parameter, the vehicle control unit 300 generates an electronic commerce authentication 122 that includes vehicle identification data (such as vehicle identification number, vehicle location data (which may be retrieved via a GPS or other geospatial location device), time-stamp or marker data relating to the position of the vehicle at the time of an electronic commerce transaction request 120 is received, etc.). The electronic commerce authentication 122 may also include messaging encryption/security data, such as a digital signature data specific to the vehicle that may be assigned via a digital wallet application executable by the vehicle control unit, the handheld mobile device 104, the head unit device 103, and/or a combination thereof, and cryptographic key data based on the vehicle identification number for encryption of the data relating an electronic commerce transaction.

The vehicle control unit 300 transmits, via the antenna 320 and communication link 132, the electronic commerce authentication 122, which in the present example, is transmitted to the handheld mobile device 104. The electronic commerce authentication 122 may be provided to network cloud 118 via communication link 139, and to server 133 via the communication link 141. As may be appreciated, the transaction source 110 may no longer be within a range suitable to receive the electronic commerce authentication 122 when the vehicle 100 is operating a velocity. In this regard, another communication link 141 is provided via the network cloud 118, and to a server 133 (e.g., a third party server) that may support the electronic commerce transaction.

As may be appreciated, the transaction source 110 provides NFC data 123 to the server 133 via a communication link 134 (e.g., a back-office communication link). In the event the transaction source 110 no longer remains within range of the vehicle 100, the server 133 may operate to continue the electronic commerce transaction request 120 via the network cloud 118 in a communication link 139 with the handheld mobile device 104, which in turn has a communication link 132 (e.g., a near field communication link) proximal to the vehicle 100.

As may be appreciated, in a brick-and-mortar retailer 119, 112, a fueling station etc., the handheld mobile device 104 may travel apart from the vehicle 100, though may acquire an electronic commerce authentication 122 when the handheld mobile device 104 is within the vehicle travel route parameter. For example, when an end user parks their vehicle 100 (and a vehicle-to-infrastructure communication may engage in a parking fee via the parking infrastructure device 114), the end user walks away from the vehicle 100 to the retailer. Though not physically with the vehicle 100, an electronic commerce transaction may be authenticated by the vehicle while within an acceptable vehicle travel route parameter.

Examples of the vehicle travel route parameter include a corridor region defined by itinerary data that includes start point data and destination point data generated by a navigation user interface, a commuter region defined by learned commuting behaviors of a vehicle user, and a historic recorded corridor region based on past travel history (that is, travel history within norms about a central home and/or office location).

Also, the vehicle travel route parameter may include an expected travel route time slot and/or window. For example, a travel route has a given distance, with a given starting coordinates. Under given traffic congestion data for a time of day, the expected speed limits (or in the normal travel speed, which may be greater), stop lights, etc., an end user has an expected arrival time. The expected travel route time slot provides a buffer for arriving at a destination coordinate early, or late. The buffer amount may be a predetermined value selected by the end user, of may be based on tolerances within customary end user driving habits.

Accordingly, an electronic commerce authentication 122 may be generated when the vehicle 100 is within an acceptable geographic coordinate, while at an acceptable time slot relative to a travel route.

FIG. 2 illustrates a navigation user interface 200, which may be provided by the end user via the handheld mobile device 104 and/or the head unit device 103. As shown, the navigation user interface 200 depicts a travel route 208 having non-uniform speeds, terrain, etc. As may be further appreciated, the navigation user interface 200 may be provided via a browser based mapping application (that is, a graphical user interface for displaying HTML files and/or mapping files via an Internet connection), which in turn may provide the data relating to the travel route.

With the example of FIG. 2, the travel route 208 is depicted as having start point data 202 and destination point data 204. The start point data 202 includes a set of vehicle route parameters with a xstart, ystart, and time tstart. The destination point data 204 includes a set of vehicle route parameters xd, yd and time td (expected). As may be appreciated, the navigation user interface 200 provides a travel route 208 based on user input to alternate routes, roads with or without toll fees, routes based on speed limits (such as highways, farm-to-market roads, city and/or neighborhood streets, etc.).

The vehicle control unit 300 is operable to retrieve location data for the vehicle 100, via a global positioning satellite (GPS) data, and generate a request, based on the location data, for map layer data via the server 233. The vehicle control unit 300 may receive, in response to the request, map layer data. The vehicle control unit 300 may then determine from the map layer data a general present traffic speed for the roadway relative to a free-flowing traffic speed.

Also, the vehicle control unit 300 may access, via a server such as server 233, mapping application and map application layer data including roadway information data, traffic layer data, geolocation layer data, etc. Layer data may be provided in a Route Network Description File (RNDF) format, and further conveyed visually to a user via the navigation user interface 200. A Route Network Description File may specify, for example, accessible road segments and provides information such as waypoints, stop sign locations, lane widths, checkpoint locations, and parking spot locations. The route network has no implied start or end point. Servers such as server 233, in addition to electronic commerce transactions, may also provide data Mission Description Files (MDF) for autonomous vehicle operation. A Mission Description Files (MDF) may operate to specify checkpoints to reach in a mission, such as along a travel route. It should be understood that the devices discussed herein may be communicatively coupled to a number of servers by way of the network cloud 118 (see FIG. 1).

Accordingly, the travel route 208 parameters may be determined based on the start point data 202, and the destination point data 204. An expected travel route time slot may be based either on (a) the total expected time to arrive at the destination point data 204, or (b) a slot more localized to vehicle location data 210 having position data $\{Xv, Yv\}$, and vehicle timestamp $\{tv\}$ at the vehicle location, within a viable time within the location of the vehicle and times $\Delta 1$ and $\Delta 2$.

In the example of FIG. 2, the toll station 116 may constitute an expected electronic commerce transaction by an infrastructure device even though the vehicle is traveling at velocity because such information is within the boundaries of the map layer data. That is, vehicle timestamp tv and position $\{Xv, Yv\}$ substantially correspond, within an expected travel route time slot and corridor region 232, to a position and time stamp data of the toll station 116 $\{X116, Y116, t116\}$ relating to the electronic commerce transaction.

As may be appreciated, the travel route time slot may be increased and/or decreased based on the activity involved. While traveling, when fuel may be needed, the time slot may be increased for the time required to fuel the vehicle at point-of-sale device, such as a fueling station 112, which includes an expected time of 112 to reach at a coordinate $\{X112, Y112\}$.

The resulting time delay may also be adjusted upon arrival at a destination such as the point-of-sale device of the brick-and-mortar retailer 119 and the associated parking infrastructure device 114, which may each depart geographically outside a corridor region 232, and beyond the expected destination arrival time td.

For example, shopping, dining, etc., at the brick-and-mortar retailer 119 may extends beyond the expected destination point data 204, as well as payment for the parking infrastructure device 114 at the end of the excursion. Accordingly, to provide electronic commerce authentication 122, the expected travel route time slot may be extended based on historic behavior, based on internet-based calendaring applications, or may be presented as a query to the user via the handheld mobile device 104 and/or the head unit device 103.

Also, a corridor region 232 may be given for a distance from the travel route 208, such as accessing the fueling station 112. The parameter for the corridor region 232 may be selected by a user, or provided by the vehicle control unit 300 based on historic behavioral data for the user.

FIG. 3 is a block diagram of a vehicle control unit 300, which may include a wireless communication interface 302, a processor 304, and memory 306, that are communicatively coupled via a bus 308.

The processor 304 in the vehicle control unit 300 can be a conventional central processing unit or any other type of device, or multiple devices, capable of manipulating or processing information. As may be appreciated, processor 304 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions.

The memory 306 and/or memory element may be a single memory device, a plurality of memory devices, and/or embedded circuitry of the processor 304. Such a memory device may be a read-only memory, random access memory, volatile memory, non-volatile memory, static memory, dynamic memory, flash memory, cache memory, and/or any device that stores digital information. The memory 306 is capable of storing machine readable instructions such that the machine readable instructions can be accessed by the processor 304. The machine readable instructions can include logic or algorithm(s) written in programming languages, and generations thereof, (e.g., 1GL, 2GL, 3GL, 4GL, or 5GL) such as, for example, machine language that may be directly executed by the processor 304, or assembly language, object-oriented programming (OOP), scripting languages, microcode, etc., that may be compiled or assembled into machine readable instructions and stored on the memory 306. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods and devices described herein may be implemented in any conventional computer programming language, as pre-programmed hardware elements, or as a combination of hardware and software components.

Note that when the processor 304 includes more than one processing device, the processing devices may be centrally located (e.g., directly coupled together via a wired and/or wireless bus structure) or may be distributed located (e.g., cloud computing via indirect coupling via a local area network and/or a wide area network). Further note that when the processor 304 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processor 304 executes, hard coded and/or operational instructions corresponding to at least some of the steps and/or functions illustrated in FIGS. 1-4 to perform electronic commerce transaction authentication features and methods described herein.

The wireless communication interface 302 generally governs and manages the vehicle user input data via the vehicle network 322 over the communication path 323 and/or communication link 132. As may be appreciated, the communication link 132 and or communication path 323 may be provided as a wireless communication link, a wired communication link, a fiber communication link, and/or a combination thereof. The wireless communication interface 302 also manages controller unit output data, such as for the navigation user interface 200 (see FIG. 2) for the head unit device 103 (see FIG. 1) or for receiving navigation data via the handheld mobile device 104 for providing the electronic commerce transaction authentications as described herein.

There is no restriction on the present disclosure operating on any particular hardware arrangement and therefore the basic features herein may be substituted, removed, added to, or otherwise modified for improved hardware and/or firmware arrangements as they may develop.

The vehicle network data 316 may further include capturing intensity or reflectivity returns of the environment surrounding the vehicle, and relative distance of vehicles via the sensor input devices 102 to base image recognition with respect to the vehicle's surrounding environment. For example, image recognition may further corroborate the vehicle coordinates gathered via GPS or other similar geospatial coordinate systems. When traveling, image recognition may identify mileage markers, business signage, road identifier information (street signage, highway signage, etc.). In general, data captured by the sensor input devices 102 and provided to the vehicle control unit 300 via the communication path 323 can be used by one or more of applications of the vehicle to determine the environment surroundings of the vehicle, and to also sense improved positional accuracy with vehicle distances.

The vehicle control unit 300 functions to authenticate an electronic commerce transaction based on an electronic commerce transaction request 120, which may be provided via a handheld mobile device 104, a network cloud 118, a transaction source 110, etc. (see FIG. 1).

The memory 306 may store travel route itinerary parameters as conveyed by the handheld mobile device 104 and/or the head unit device 103, parameters for a corridor region defined by itinerary data that includes start point data and destination point data generated by a navigation user interface, a commuter region defined by learned commuting behaviors of a vehicle user, including a commute start point and destination data and corresponding travel time estimation data, a recorded corridor region defined by traveled itinerary data and associated time marker data.

The memory 306 may also store vehicle identification data, such as a vehicle identification number (VIN), vehicle location data (which may be retrieved via a GPS or other geospatial location device), vehicle identification number, vehicle location data relating to a position of the vehicle, vehicle time stamp data relating to the position of the vehicle at the time of an electronic commerce transaction request 120 is received, digital signature data specific to the vehicle, as may be assigned via a digital wallet application executable by the vehicle control unit, the handheld mobile device 104, the head unit device 103, and/or a combination thereof, and cryptographic key data based on the vehicle identification number for encryption of the data relating an electronic commerce transaction.

FIG. 4 shows an example process 400 for providing electronic commerce transaction authentication relating to a vehicle location and timestamp and/or time marker data. The process 400 operates to authenticate an electronic commerce transaction based on expected and/or anticipated transactions as defined by a travel route of a vehicle within certain tolerances. Examples of such tolerances may include a corridor region about the travel route, and also an expected travel route time slot.

In operation 402, a vehicle control unit receives, via a communication link, an electronic commerce transaction request relating to a transaction source. The electronic commerce transaction request may include source location data. Further, the request may include transaction time stamp data for correlating with vehicle positional and timestamp information. The transaction source may be an infrastructure device, such as, for example, a toll road device, a parking infrastructure device, etc. The transaction source may be a point-of-sale device, such as a fuel pump device, a brick-and-mortar point-of-sale device, etc.

In operation 404, the vehicle control unit may operate to authenticate the transaction source against a vehicle travel route parameter. For example, at operation 406, the source location data of the transaction source (such as location and/or timestamp data) may be compared with a vehicle travel route parameter. The travel route parameter may include data relating to (a) the vehicle travel route and a corridor region about the route, (b) an expected travel route time slot of the travel route parameter (that is, a time timestamp of the request corresponds or compares favorably with the time the vehicle would be near the transaction source, within tolerances), or (c) a combination thereof.

As may be appreciated, the travel route data and associated a corridor region may be defined by itinerary data that includes start point data and destination point data generated by a navigation user interface. Also, the travel route data may be based on a commuter region defined by learned commuting behaviors of a vehicle user in the averaged time and routes traveled to arrive at work, including commute start point data and commute destination point data and corresponding travel time estimation data. Further, the travel route data may be based on a recorded corridor region defined by traveled itinerary data and associated time marker data associated with a home-base location of the user (such as within a limited region and time of day normally travelled).

A request with information outside permitted corridor and expected travel time slot would not compare favorably, and at operation 408, the process 400 would end.

When, at operation 408, the source location data compares favorably with the vehicle travel route parameter, the operation proceeds to operation 410 in which the vehicle control unit, in response to the electronic commerce transaction request, generates an electronic commerce authentication that includes vehicle identification data.

The vehicle identification data may include further information to corroborate the authentication, such as a vehicle identification number (VIN), vehicle location data as retrieved from GPS or other geospatial coordinate applications, a vehicle time stamp data, digital signature data apart from the vehicle identification number, and/or a cryptographic key data based on the vehicle identification number. The digital signature data and the cryptographic key may further be implemented to secure the wireless communication, and further established a coupling and/or connection with the digital wallet application associated with the vehicle control unit and the process executed therein.

At operation 412, the vehicle control unit transmits the electronic commerce authentication. With the electronic commerce authentication, the transaction may be completed. In the event the authentication is not transmitted, the electronic commerce transaction may be suspended, pending further information, and may raise an unauthorized transaction warning to the user, and/or the banking or financial services provider.

While particular combinations of various functions and features of the present invention have been expressly described herein, other combinations of these features and functions are possible that are not limited by the particular examples disclosed herein are expressly incorporated within the scope of the present invention.

As one of ordinary skill in the art may appreciate, the term "substantially" or "approximately," as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items range from a difference of a few percent to magnitude differences. As one of ordinary skill in the art may further appreciate, the term "coupled," as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (that is, where one element is coupled to another element by inference) includes direct and indirect coupling between two elements in the same manner as "coupled." As one of ordinary skill in the art will further appreciate, the term "compares favorably," as may be used herein, indicates that a comparison between two or more elements, items, signals, et cetera, provides a desired relationship. For example, when the desired relationship is that a first signal has a greater magnitude than a second signal, a favorable comparison may be achieved when the magnitude of the first signal is greater than that of the second signal, or when the magnitude of the second signal is less than that of the first signal.

As the term "module" is may be used in the description of the drawings, a module includes a functional block that is implemented in hardware, software, and/or firmware that performs one or more functions such as the processing of an input signal to produce an output signal. As used herein, a module may contain submodules that themselves are modules.

Thus, there has been described herein an apparatus and method, as well as several embodiments including a preferred embodiment, for implementing an electronic commerce transaction authentication based on a vehicle travel route.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretations so as to encompass all such modifications and equivalent structures as is permitted under the law.

What is claimed is:

1. A method in a vehicle control unit for providing payment authentication, the vehicle control unit being a part of a vehicle, the method comprising:

transmitting an electronic payment request by a user device associated with the vehicle to a transaction source;

in response to transmitting the electronic payment request, receiving, via a communication link, an authentication request from the transaction source that includes source location data of the transaction source and timestamp data of the authentication request;

in response to receiving the authentication request, comparing the source location data of the transaction source with a travel route of the vehicle by the vehicle control unit, the travel route of the vehicle including at least one of:
 a corridor region defined by itinerary data that includes start point data and destination point data generated by a navigation user interface;
 a commuter region defined by learned commuting behaviors of a vehicle user, including commute start point data and commute destination point data and corresponding travel time estimation data; and
 a recorded corridor region defined by traveled itinerary data and associated time marker data;

determining a current location of the vehicle using a global positioning system or a geospatial location device;

determining a timestamp of the vehicle at the current location;

determining an expected travel route time slot based on the timestamp of the vehicle at the current location, wherein the expected travel route time slot indicates a viable time for the authentication request;

comparing the timestamp data of the authentication request with the expected travel route time slot;

when the source location data compares favorably with the current location of the vehicle and the timestamp data compares favorably with the expected travel route time slot:
 generating, in response to the authentication request, a payment authentication that includes vehicle identification data; and
 transmitting, via the communication link, the payment authentication to the transaction source to effectuate the electronic payment request, whereby the transaction source is authenticated; and when the source location data does not compare favorably with the current location of the vehicle or the timestamp data does not compare favorably with the expected travel route time slot, a payment authentication is not transmitted to the transaction source.

2. The method of claim 1, further comprising:
determining whether the electronic payment request originates from a trusted user device.

3. The method of claim 2, wherein the trusted user device comprising at least one of:
a handheld mobile device;
a vehicular audio/visual control unit;
a point-of-sale device; and
an infrastructure device.

4. The method of claim 1, wherein the communication link is at least one of:
a wireless communication link;
a wired communication link; and
a fiber communication link.

5. The method of claim 1, wherein the vehicle identification data includes at least one of a:
vehicle identification number;
vehicle location data;
vehicle time stamp data;
digital signature data; and
cryptographic key data based on the vehicle identification number.

6. A method in a vehicle control unit for providing payment authentication, the vehicle control unit being a part of a vehicle, the method comprising:
transmitting an electronic payment request by a user device associated with the vehicle to a transaction source;

in response to transmitting the electronic payment request, receiving, via a communication link formed with the user device, an authentication request from the transaction source that includes source location data of the transaction source and timestamp data of the authentication request;

in response to receiving the authentication request, comparing the source location data of the transaction source with a travel route of the vehicle by the vehicle control unit, generated via a navigation user interface, the travel route of the vehicle including at least one of:
 a corridor region defined by itinerary data that includes start point data and destination point data generated by a navigation user interface;
 a commuter region defined by learned commuting behaviors of a vehicle user, including commute start point data and commute destination point data and corresponding travel time estimation data; and
 a recorded corridor region defined by traveled itinerary data and associated time marker data;

determining a current location of the vehicle using a global positioning system or a geospatial location device;

determining a timestamp of the vehicle at the current location;

determining an expected travel route time slot based on the timestamp of the vehicle at the current location, wherein the expected travel route time slot indicates a viable time for the authentication request;

comparing the timestamp data of the authentication request with the expected travel route time slot;

when the source location data compares favorably with the current location of the vehicle and the timestamp data compares favorably with the expected travel route time slot:
 generating, in response to the authentication request, a payment authentication that includes vehicle identification data; and
 transmitting, via the communication link, the payment authentication to the transaction source to effectuate the electronic payment request, whereby the transaction source is authenticated; and when the source location data does not compare favorably with the current location of the vehicle or the timestamp data does not compare favorably with the expected travel route time slot, a payment authentication is not transmitted to the transaction source.

7. The method of claim 6, wherein the user device comprising at least one of:
a handheld mobile device;
a head unit device;
a point-of-sale device; and
an infrastructure device.

8. The method of claim 6, wherein the vehicle identification data includes at least one of a:
vehicle identification number;
vehicle location data;
vehicle time stamp data;
digital signature data; and
cryptographic key data based on the vehicle identification number.

9. A system for providing payment authentication, the system comprising:
a vehicle;
a vehicle control unit being a part of the vehicle, the vehicle control unit including:
a wireless communication interface to service communication with a digital wallet application of a handheld mobile device associated with the vehicle, wherein the digital wallet application is configured to transmit an electronic payment request to a transaction source;
a processor coupled to the wireless communication interface, the processor for controlling operations of the vehicle control unit; and
a memory coupled to the processor, the memory for storing data and program instructions used by the processor, the processor configured to execute instructions stored in the memory to:
in response to transmitting the electronic payment request, receive, via a communication link with the handheld mobile device, an authentication request from the transaction source that includes source location data of the transaction source and timestamp data of the authentication request;
in response to receiving the authentication request, comparing the source location data of the transaction source with a travel route of the vehicle, the travel route of the vehicle including at least one of:
a corridor region defined by itinerary data that includes start point data and destination point data generated by a navigation user interface;
a commuter region defined by learned commuting behaviors of a vehicle user, including commute start point data and commute destination point data and corresponding travel time estimation data; and
a recorded corridor region defined by traveled itinerary data and associated time marker data;
determining a current location of the vehicle using a global positioning system or a geospatial location device;
determining a timestamp of the vehicle at the current location;
determining an expected travel route time slot based on the timestamp of the vehicle at the current location, wherein the expected travel route time slot indicates a viable time for the authentication request;
comparing the timestamp data of the authentication request with the expected travel route time slot;
when the source location data compares favorably with the current location of the vehicle and the timestamp data compares favorably with the expected travel route time slot:
generate, in response to the authentication request, a payment authentication that includes vehicle identification data; and
transmit, via the communication link with the handheld mobile device, the payment authentication to the transaction source to effectuate the electronic payment request, whereby the transaction source is authenticated; and when the source location data does not compare favorably with the current location of the vehicle or the timestamp data does not compare favorably with the expected travel route time slot, a payment authentication is not transmitted to the transaction source.

10. The vehicle control unit of claim 9, wherein the travel route of the vehicle is based on the navigation user interface of at least one of:
the handheld mobile device;
a head unit device; and
a browser based mapping application.

11. The vehicle control unit of claim 9, wherein the vehicle identification data includes at least one of a:
vehicle identification number;
vehicle location data;
vehicle time stamp data;
digital signature data; and
cryptographic key data based on the vehicle identification number.

12. A system for providing payment authentication, the system comprising:
a vehicle;
a vehicle control unit that is a part of the vehicle, the vehicle control unit including:
a wireless communication interface to service communication with a digital wallet application of a handheld mobile device associated with the vehicle, wherein the digital wallet application is configured to transmit an electronic payment request to a transaction source;
a processor coupled to the wireless communication interface, the processor for controlling operations of the vehicle control unit; and
a memory coupled to the processor, the memory for storing data and program instructions used by the processor, the processor configured to execute instructions stored in the memory to:
in response to transmitting the electronic payment request, receive an authentication request from the transaction source that includes source location data of the transaction source and timestamp data of the authentication request;
comparing the timestamp data of the authentication request with a time-based corridor of an anticipated travel route the vehicle;
comparing the source location data of the authentication request with a geographic-based corridor of the anticipated travel route of the vehicle;
when the source location data compares favorably with the geographic-based corridor and the timestamp data compares favorably with the time-based corridor:
generate, in response to the authentication request, a payment authentication that includes vehicle identification data; and
transmit, via a communication link with the handheld mobile device, the payment authentication to the transaction source to effectuate the electronic payment request.

* * * * *